United States Patent
Steinmeyer et al.

(10) Patent No.: US 11,520,038 B2
(45) Date of Patent: Dec. 6, 2022

(54) METHOD AND DEVICE FOR CHECKING A CALIBRATION OF ENVIRONMENT SENSORS

(71) Applicant: VOLKSWAGEN AKTIENGESELLSCHAFT, Wolfsburg (DE)

(72) Inventors: Simon Steinmeyer, Braunschweig (DE); Alexander Schwithal, Braunschweig (DE)

(73) Assignee: Volkswagen Aktiengesellschaft

( * ) Notice: Subject to any disclaimer, the term of this patent is extended or adjusted under 35 U.S.C. 154(b) by 225 days.

(21) Appl. No.: 16/989,973

(22) Filed: Aug. 11, 2020

(65) Prior Publication Data

US 2021/0048524 A1 Feb. 18, 2021

(30) Foreign Application Priority Data

Aug. 15, 2019 (DE) ...................... 10 2019 212 279.5

(51) Int. Cl.
| | |
|---|---|
| *G01S 13/931* | (2020.01) |
| *G01S 7/40* | (2006.01) |
| *G01S 13/86* | (2006.01) |
| *G01S 17/931* | (2020.01) |
| *G01S 7/52* | (2006.01) |

(52) U.S. Cl.
CPC .......... *G01S 13/931* (2013.01); *G01S 7/4026* (2013.01); *G01S 13/867* (2013.01); *G01S 17/931* (2020.01); *G01S 7/52004* (2013.01); *G01S 2013/93271* (2020.01)

(58) Field of Classification Search
None
See application file for complete search history.

(56) References Cited

U.S. PATENT DOCUMENTS

| | | | |
|---|---|---|---|
| 8,775,064 B2 | 7/2014 | Zeng et al. | |
| 9,903,946 B2 * | 2/2018 | Willey | G01S 13/931 |
| 10,582,121 B2 * | 3/2020 | Kamilov | G01S 13/867 |
| 2007/0182623 A1 | 8/2007 | Zeng et al. | |
| 2010/0235129 A1 * | 9/2010 | Sharma | G01S 7/4972 |
| | | | 702/97 |
| 2015/0260498 A1 * | 9/2015 | Soohoo | G01S 7/52004 |
| | | | 73/1.79 |

FOREIGN PATENT DOCUMENTS

| | | | | |
|---|---|---|---|---|
| CN | 109961420 A | * | 7/2019 | ............ G06T 7/136 |
| CN | 109961637 A | * | 7/2019 | ............ G08G 1/107 |
| DE | 102007005121 A1 | | 9/2007 | |

(Continued)

*Primary Examiner* — Bernarr E Gregory
(74) *Attorney, Agent, or Firm* — Barnes & Thornburg, LLP

(57) ABSTRACT

A method for checking a calibration of N environmental sensors, wherein the N environmental sensors acquire an environment and each provide sensor data, N subfusions are formed from the acquired sensor data, each of the N subfusions leaves sensor data of one singular one of the N environmental sensors unconsidered upon the fusing, fusion results of the N subfusions are compared to one another, an incorrect calibration of the N environmental sensors is established based on a comparison result, and a check result is provided. Also disclosed are an associated device and a transportation vehicle.

18 Claims, 2 Drawing Sheets

(56) References Cited

FOREIGN PATENT DOCUMENTS

| | | |
|---|---|---|
| DE | 102012102769 A1 | 11/2012 |
| DE | 102014014295 A1 | 3/2016 |
| DE | 102017007765 A1 | 1/2018 |
| DE | 102018101913 A1 | 8/2019 |
| WO | 2015151055 A1 | 10/2015 |

* cited by examiner

US 11,520,038 B2

METHOD AND DEVICE FOR CHECKING A CALIBRATION OF ENVIRONMENT SENSORS

PRIORITY CLAIM

This patent application claims priority to German Patent Application No. 10 2019 212 279.5, filed 15 Aug. 2019, the disclosure of which is incorporated herein by reference in its entirety.

SUMMARY

Illustrative embodiments relate to a method and a device for checking a calibration of N environmental sensors.

BRIEF DESCRIPTION OF THE DRAWINGS

Disclosed embodiments are explained in greater detail hereinafter with reference to the figures. In the figures.

DETAILED DESCRIPTION

Figure 1:
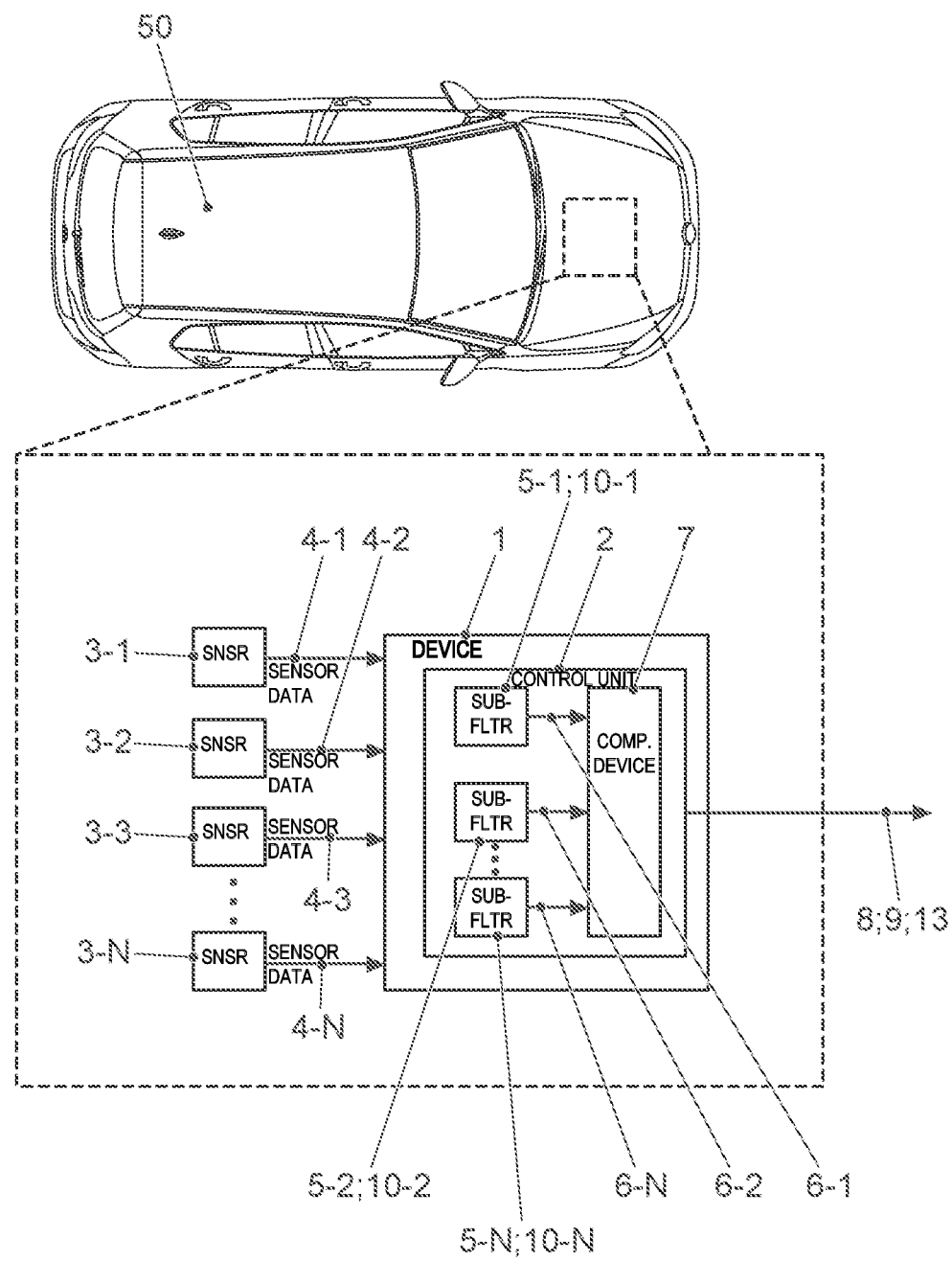
FIG. 1 shows a schematic illustration of an exemplary embodiment of the device.

Present and future transportation vehicles are usually equipped with a multiplicity of vehicle systems, for example, driver assistance systems and/or safety systems, which evaluate sensor data from a multiplicity of sensors of the transportation vehicle that acquire an environment. Such driver assistance systems implement functions which assist the driver in various driving situations. In this regard, evasion and parking assistants, adaptive cruise controls for a longitudinal control of the transportation vehicle (ACC—Adaptive Cruise Control), lateral control systems, for example, lane keeping systems or lane departure warning units, and in future also fully automatic lateral and longitudinal control are mentioned here by way of example. Each of these driver assistance systems and other vehicle systems require exact sensor data in the context of physically related uncertainties for correct functioning.

To ensure the required accuracy on the part of the sensors, calibrating the sensors exactly with respect to the installation position in the transportation vehicle and their acquisition ranges is known. This means that extrinsic calibration parameters are acquired which describe the installation position and thus also the acquisition range, wherein the installation position also comprises an orientation of the respective sensor. This calibration generally takes place for every sensor during the production of the transportation vehicle.

However, it is problematic in this case that a decalibration of the environmental sensors with regard to the extrinsic calibration parameters, which can be used by the evaluation units of the environmental sensors themselves and/or the evaluation units of the vehicle systems, can occur in the course of the lifetime of the transportation vehicle due to different influences. These influences include, inter alia, geometric changes of a sensor alignment, for example, due to settling behavior or accidents, or environmental influences such as rock impacts, condensation, or soiling. A loss of a required accuracy can occur in this way, whereby any function of a vehicle system, in particular, any driver assistance function, experiences a degradation of the functionality.

In the case of an object recognition in the environment of the transportation vehicle carried out on the basis of the acquired sensor data, sensor data of a decalibrated environmental sensor can result in a loss of plausibility of objects, which are acquired by a plurality of environmental sensors in the environment. A decalibration of even a single environmental sensor also already has a negative influence on a quality of the fused sensor data in the case of a fusion of sensor data of a plurality of environmental sensors.

A method for monitoring a calibration of a plurality of sensors installed at an installation position in the transportation vehicle described by extrinsic calibration parameters with respect to extrinsic calibration parameters is known from DE 10 2014 014 295 A1. The sensors acquire sensor data from the environment of a transportation vehicle. To ascertain a decalibration of at least one sensor, sensor data of different environmental sensors which describe the same feature of the environment in the same property are evaluated by at least one decalibration criterion comparing the sensor data.

The disclosed embodiments provide a method and a device for checking a calibration of N environmental sensors.

A method for checking a calibration of N environmental sensors is provided, wherein the N environmental sensors acquire an environment and each provide sensor data, wherein N subfusions are formed from the acquired sensor data, wherein each of the N subfusions each leaves sensor data of one singular one of the N environmental sensors unconsidered upon the fusing, i.e., in particular, in each case only uses sensor data of N−1 environmental sensors upon the fusing, wherein fusion results of the N subfusions are compared to one another, wherein an incorrect calibration of the N environmental sensors is established on the basis of a comparison result, and wherein a check result is provided.

Furthermore, a device for checking a calibration of N environmental sensors is provided, comprising a control unit, wherein the control unit is designed so as to obtain sensor data from N environmental sensors, which acquire an environment, to form N subfusions from the acquired sensor data, wherein each of the N subfusions each leaves sensor data of one singular one of the N environmental sensors unconsidered upon the fusing, i.e., in particular, in each case only uses sensor data of N−1 environmental sensors upon the fusing, to compare fusion results of the N subfusions to one another, to establish an incorrect calibration of the N environmental sensors on the basis of a comparison result, and to provide a check result.

The method and the transportation vehicle enable a calibration of the environmental sensors to be checked in an improved manner. This is performed by fusing the sensor data provided by the N environmental sensors to form N subfusions. In each of the N subfusions, in each case one of the environmental sensors is not considered, i.e., in each of the subfusions only sensor data of a subset of the N environmental sensors is used, i.e., in particular, in each case only sensor data of N−1 environmental sensors. For this purpose, the subsets are formed in such a way that each of the N environmental sensors is not comprised by one of the N subsets. If a single environmental sensor is decalibrated, precisely one subfusion thus exists which is error-free. In contrast to a consideration or a comparison of the sensor data of individual environmental sensors, the formation of subfusions has the benefit that noise is reduced. Furthermore, in this way an accuracy can also be improved, a resolution can be increased, and/or outliers can be filtered out. The fusion results, i.e., the respective fused sensor data, are subsequently compared to one another. Alternatively or additionally, other quality criteria of the individual subfusions or subfilters, for example, a standard deviation within a subfusion, can also be used for the comparison. If there is no decalibration, the fusion results or quality criteria thus correspond to one another. However, if at least one of the environmental sensors is decalibrated in comparison to the other environmental sensors, the fusion results and/or quality criteria thus deviate from one another. If the fusion results deviate from one another, for example, if a difference value formed in pairs in each case from the fusion results exceeds a predetermined (absolute or relative) threshold value, a decalibration is thus established. A check result is provided on the basis of the comparison result, i.e., starting from the comparison result. The check result comprises an item of information as to whether the N environmental sensors are decalibrated (with respect to one another) or not. The check result can be output, for example, as a check result signal, for example, as a digital data packet.

Environmental sensors can be the following sensors, for example: a camera, a laser scanner or Light Detection and Ranging (LIDAR) sensor, a radar sensor, and/or an ultrasound sensor. Sensor data image the acquired environment, in particular, two-dimensionally or three-dimensionally, for example, as two-dimensional or three-dimensional camera images or as three-dimensional point clouds.

A subfusion is carried out in particular by a suitable subfilter. The subfilter fuses the sensor data of the environmental sensors to form fused sensor data.

The decalibration is established with respect to extrinsic calibration parameters. A position and an alignment of an environmental sensor in relation to a reference object are referred to as extrinsic calibration parameters. A decalibration can also include a time offset induced by an incorrect time synchronization between the environmental sensors. The reference object can be a transportation vehicle. The extrinsic calibration parameters relate for this purpose to the same coordinate system for all environmental sensors.

If the decalibration is established, in particular, a decalibration of the environmental sensors with respect to one another is established. An absolute decalibration cannot be determined, in contrast, i.e., if all of the plurality of environmental sensors are decalibrated in the same way with respect to the extrinsic calibration parameters, this cannot be established by the method. However, experience has shown that it is rather to be presumed that with a plurality of environmental sensors, the case occurs that one or only a few of the N environmental sensors is decalibrated or are decalibrated.

The method is executed by a control unit. The control unit can be designed as a combination of hardware and software, for example, as program code which is executed on a microcontroller or microprocessor. The control unit comprises a storage unit or can access a storage unit. The processing unit can execute processing operations to execute the method in the storage unit.

In at least one exemplary embodiment, it is provided that the condition $N>=3$ is met and a decalibrated environmental sensor is identified on the basis of the comparison result, wherein the check result comprises an item of information on the identified environmental sensor and/or an item of information for identifying at least one error-free subfusion. If, in the case of three environmental sensors, one of the environmental sensors is decalibrated, a fusion result of one of the subfusions will thus deviate from the fusion results of the other two subfusions, because this subfusion does not contain the sensor data of the decalibrated environmental sensor. The decalibrated environmental sensor can be unambiguously identified in this way, so that measures can be taken which deactivate the decalibrated environmental sensor, for example, or no longer consider its sensor data when providing a driver assistance function. Additionally or alternatively, an item of information for identifying at least one error-free subfusion can also be provided on the basis of the comparison result. Starting from this information, the identified error-free subfusion can be provided and used, for example, for a required driving function. This is beneficial if methods are used which operate using history-based sensor data. It can also be provided that a warning and/or maintenance notice is generated and output. The provided check result comprises an item of information about the decalibrated environmental sensor. In the case of the three environmental sensors by way of example, with one decalibrated environmental sensor, the error-free subfusion is then the one which deviates from the other two, i.e., the one which does not comprise the sensor data of the decalibrated environmental sensor. With more than three environmental sensors, a decalibrated environmental sensor or an error-free subfusion is identified accordingly.

In at least one exemplary embodiment, it is provided that N object hypotheses are generated from the sensor data of the N environmental sensors and/or received from the environmental sensors, wherein the formation of the subfusions and the comparison are carried out on the basis of the generated and/or received N object hypotheses. An object hypothesis comprises an estimation of object properties of the object. The object hypotheses comprise a position and/or an orientation of objects in the acquired and provided sensor data of the environmental sensors. Suitable estimation methods, for example, Kalman filter, simultaneous localization and mapping (SLAM), etc., and methods for machine learning and computer vision can be used when generating the object hypotheses. The determination of a decalibration can be further improved in this way.

In another exemplary embodiment, it is provided that the object hypotheses are generated and/or received as bounding boxes. The bounding boxes comprise coordinates of rectangles or boxes which enclose the recognized objects or an associated object contour. The bounding boxes can be two-dimensional or three-dimensional. A decalibration can take place here on the basis of a comparison of corner points of these bounding boxes. The method can be carried out in a particularly simple manner in this way.

In at least one exemplary embodiment, it is provided that at least one translation matrix and/or at least one rotation matrix is determined on the basis of the generated and/or obtained object hypotheses, wherein an incorrect calibration is established on the basis of a comparison of the at least one translation matrix and/or the at least one rotation matrix or at least one value derived therefrom to at least one threshold value. A translation matrix and a rotation matrix can be derived in a simple manner from the object hypotheses, in particular, from respective corner points of bounding boxes, by transferring or transforming them into one another in pairs. It is provided that, for each pair of subfusions which is compared to one another, one translation matrix and/or one rotation matrix is determined in each case. In a simple example, the translation matrix may be a translation vector. One translation vector and one rotation matrix are then each available for all combinations in pairs of subfusions. For perfectly calibrated environmental sensors, the translation vector corresponds to the zero vector. To detect a decalibration, the deviation of the absolute value of the translation vector T is compared to a vector made up of threshold values S2, i.e., it is checked whether:

$$|T|>S_2$$

wherein the vector $S_2$ consists of three individual scalar threshold values for the individual translation directions $s_D$, $s_E$, $s_F$:

$$S_2 = \begin{pmatrix} s_D \\ s_E \\ s_F \end{pmatrix}.$$

For perfectly calibrated environmental sensors, the resulting rotation matrix R is identical to the unity matrix I, i.e., no rotation is necessary. To detect a decalibration, the deviation of the rotation matrix R from the unity matrix I is compared to a matrix made up of threshold values S1, i.e., it is checked whether:

$$|R-I|>S_1$$

wherein the matrix $S_1$ consists of three individual scalar threshold values for the individual rotational directions $s_A$, $s_B$, $s_C$:

$$S_1 = \begin{pmatrix} s_A & 0 & 0 \\ 0 & s_B & 0 \\ 0 & 0 & s_C \end{pmatrix}.$$

In at least one disclosed embodiment, it is provided that parameters for a cross calibration are derived and provided on the basis of the at least one translation matrix and/or the at least one rotation matrix. These parameters may be derived directly from the at least one translation matrix and/or the at least one rotation matrix. For this purpose, for example, for the decalibrated environmental sensor, a translation and/or rotation is executed on or applied to the associated sensor data iteratively until the resulting translation matrix and/or rotation matrix in the subfusion or in the subfilter meets the above-mentioned threshold value criterion.

Features of the design of the device result from the description of designs of the method. The benefits of the device are identical in each case here as in the designs of the method.

Furthermore, a transportation vehicle is also provided, comprising N environmental sensors for acquiring an environment of the transportation vehicle and a device according to any one of the described embodiments.

A schematic illustration of an exemplary embodiment of the device 1 is shown in FIG. 1. The device 1 comprises a control unit 2. The device 1 is arranged, for example, in a transportation vehicle 50. The transportation vehicle 50 comprises N environmental sensors 3-1, 3-2, 3-3, . . . , 3-N, which each acquire an environment of the transportation vehicle 50 and provide sensor data 4-1, 4-2, 4-3, . . . , 4-N.

The control unit 2 receives the sensor data 4-*x* of the environmental sensors 3-*x*, for example, via an interface (not shown) suitable for this purpose. From the received sensor data 4-*x*, the control unit forms N subfusions 10-*x*, wherein each of the N subfusions each leaves sensor data 4-*x* of one singular one of the environmental sensors 3-*x* unconsidered upon the fusing. The subfusions 10-*x* are formed by the control unit 2 by suitable N subfilters 5-*x*, in such a way that each of the environmental sensors 3-*x* remains unconsidered in one of the subfusions 10-*x*.

The diffusion results 6-*x* of the N subfusions 10-*x* are compared to one another by the control unit 2, for example, in a comparator unit 7. On the basis of a comparison result derived from the comparison, the control unit 2 establishes an incorrect calibration of the environmental sensors 3-*x*. A deviation between the individual fusion results 6-*x* is determined in pairs in each case, which is subsequently compared to a threshold value. If the threshold value is exceeded, a decalibration of at least one of the environmental sensors 3-*x* thus exists.

After the comparison, the control unit 2 provides a check result 8, in particular, as a check result signal 9, which is output, for example, as a digital data packet at an interface (not shown) suitable for this purpose.

It can be provided that the condition N>=3 is met and a decalibrated environmental sensor 3-*x* is identified on the basis of the comparison result, wherein the comparison result 8 in this case comprises an item of information on the identified environmental sensor 3-*x* and/or an item of information for identifying at least one error-free subfusion 10-*x*.

It can be provided that in each case N object hypotheses are generated from the sensor data 4-*x* of the N environmental sensors 3-*x* and/or received from the environmental sensors 3-*x*, wherein the formation of the subfusions 10-*x* and the comparison are carried out on the basis of the generated and/or received N object hypotheses.

It can be provided that the object hypotheses are generated and/or received as bounding boxes.

Furthermore, it can be provided that at least one translation matrix and/or at least one rotation matrix are determined on the basis of the generated and/or received object hypotheses, wherein an incorrect calibration is established on the basis of a comparison of the at least one translation matrix and/or the at least one rotation matrix or at least one value derived therefrom to at least one threshold value. In the simplest case, the translation matrix is formed as a translation vector.

Furthermore, it can be provided that parameters 13 for a cross calibration are derived and provided on the basis of the at least one translation matrix and/or the at least one rotation matrix.

Figure 2:
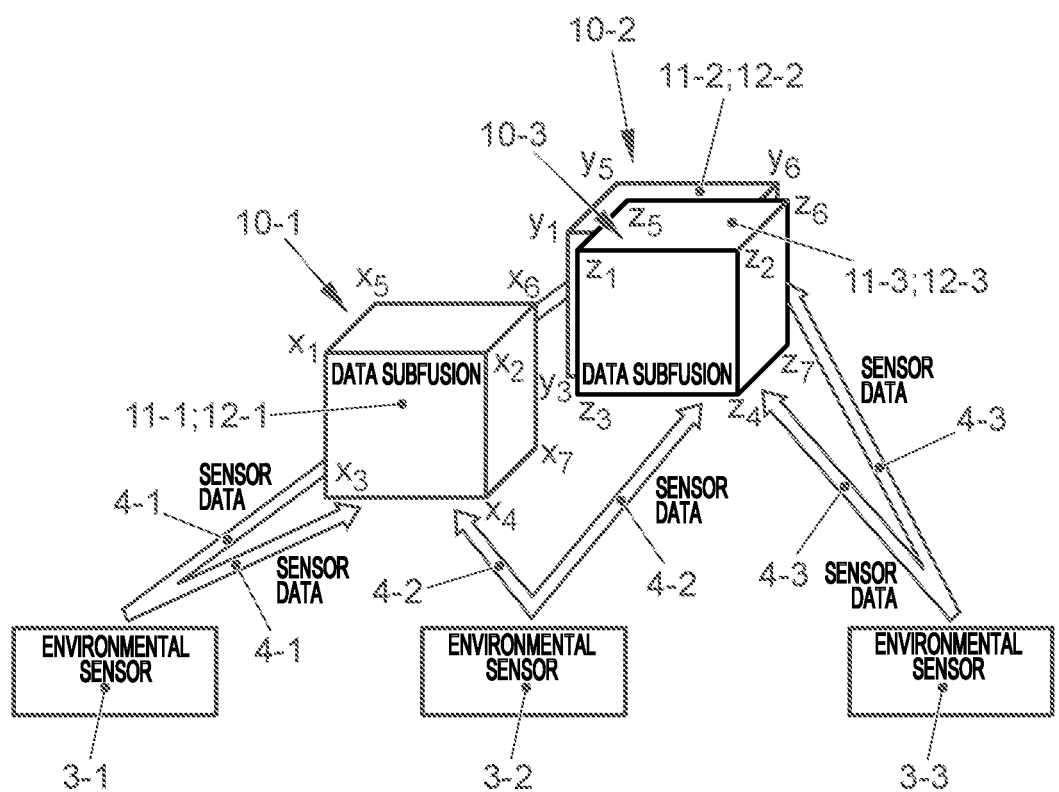
FIG. 2 shows a schematic illustration of the subfusions to illustrate the disclosed embodiments.

A schematic illustration of the subfusions 10-1, 10-2, 10-3 to illustrate the disclosed embodiments is shown in FIG. 2. In this case, three object hypotheses 11-1, 11-2, 11-3 are shown as bounding boxes 12-1, 12-2, 12-3, which each correspond to the same object in the environment. The bounding boxes 12-1, 12-2, 12-3 are each defined via seven visible corner points, which are expressed via three-dimensional coordinates, wherein the coordinates of the bounding box 12-1 are each identified with index x, the coordinates of the bounding box 12-2 are each identified with index y, and the coordinates of the bounding box 12-3 are each identified with index z.

To provide the object hypotheses 11-1, 11-2, 11-3 and/or the bounding boxes 12-1, 12-2, 12-3, acquired sensor data 4-1, 4-2, 4-3 from three environmental sensors 3-1, 3-2, 3-3 are fused with one another in subfusions 10-1, 10-2, 10-3. The object hypotheses 11-1, 11-2, 11-3 are each provided by observers of the same type, e.g., Kalman filter, simultaneous localization and mapping (SLAM), etc. The subfusion 10-1 fuses in this case the sensor data 4-1, 4-2 of the environmental sensors 3-1, 3-2. The subfusion 10-2 fuses the sensor data 4-1, 4-3 of the environmental sensors 3-1, 3-3. The subfusion 10-3 fuses the sensor data 4-2, 4-3 of the environmental sensors 3-2, 3-3.

If the environmental sensors 3-1, 3-2, 3-3 are calibrated with one another, the object hypotheses 11-1, 11-2, 11-3 and/or the bounding boxes 12-1, 12-2, 12-3 estimated via the subfusions 10-1, 10-2, 10-3 are thus located one on top of another, i.e., the indexed coordinates x, y, and z are each equal. In the example shown, however, it can be seen that the bounding boxes 12-1, 12-2, 12-3 are not located one on top of another, since at least one of the environmental sensors 3-1, 3-2, 3-3 is decalibrated.

Each two of the bounding boxes 12-1, 12-2, 12-3 can be transferred into one another in a simple example by a translation vector T and a rotation matrix R. An additional scaling factor is to be neglected here for the sake of simplicity, but can also be taken into consideration. The coordinate vectors x and y of the bounding boxes 12-1, 12-2 can be transferred into one another here by the following equation:

$$\underline{x} = \underline{y} \cdot R + T$$

Accordingly, the other possible pairs of coordinate vectors x, y, z of the bounding boxes 12-1, 12-2, 12-3 can also be transferred into one another. For environmental sensors 3-1, 3-2, 3-3 which are calibrated and/or aligned error-free with respect to one another, the rotation matrix R corresponds to a unity matrix. The translation vector T is identical to the zero vector in this case. However, if at least one environmental sensor 3-1, 3-2, 3-3 is incorrectly aligned, the translational and rotational alignment errors result directly from the individual coordinates of the corner points of the bounding boxes 12-1, 12-2.

If the translation vector T and the rotation matrix R are each compared to threshold values, an incorrect calibration of the environmental sensors 3-1, 3-2, 3-3 can thus be established.

It can be provided that parameters for a cross calibration are derived and provided on the basis of the translation vector T and the rotation matrix R.

LIST OF REFERENCE SIGNS 1 device
2 control unit
3-x environmental sensor
4-x sensor data
5-x subfilter
6-x fusion result
7 comparator unit
8 check result
9 check result signal
10-x subfusion
11-1 object hypothesis
11-2 object hypothesis
12-1 bounding box
12-2 bounding box
13 parameter (cross calibration)
N number of environmental sensors
T translation vector (translation matrix)
R rotation matrix

The invention claimed is:

1. A device for a transportation vehicle, the device comprising:
at least three environmental sensors configured to detect an environment of the transportation vehicle and generate sensor data relative thereto; and
a control unit communicatively coupled to the at least three environmental sensors and configured to:
receive sensor data from the at least three environmental sensors,
generate a plurality of data subfusions, wherein each data subfusion is based on sensor data of a plurality of the at least three environmental sensors excluding sensor data of a different one of the at least three environmental sensors,
compare the plurality of data subfusions with one another to determine that a calibration of at least one of the at least three environmental sensors is incorrect and identify the at least one of the at least three environmental sensors as a decalibrated environmental sensor, and
generate, based on comparing the plurality of data subfusions with one another, an item of information to correct the calibration of the decalibrated environmental sensor.

2. The device of claim 1, wherein the item of information identifies at least one of the decalibrated environmental sensor and at least one of the plurality of data subfusion that is error-free.

3. The device of claim 1, wherein the control unit is configured to one of generate object hypotheses based on the sensor data of the at least three environmental sensors and receive the object hypotheses from the at least three environmental sensors, and wherein the control unit is configured to both generate the plurality of data subfusions and compare the plurality of data subfusions with one another based on the object hypotheses.

4. The device of claim 3, wherein the object hypotheses include bounding boxes.

5. The device of claim 3, wherein the control unit is configured to determine at least one translation matrix and/or at least one rotation matrix based on the object hypotheses, and wherein to compare the plurality of data subfusions to determine the decalibrated environmental sensor includes comparing the at least one translation matrix and/or the at least one rotation matrix or at least one value derived therefrom to at least one threshold value.

6. The device of claim 5, wherein the control unit is configured to derive parameters for a cross calibration based on the at least one translation matrix and/or the at least one rotation matrix.

7. A transportation vehicle comprising:
at least three environmental sensors for acquiring sensor data related to an environment of the transportation vehicle; and
a control unit communicatively coupled to the at least three environmental sensors and configured to
receive sensor data from the at least three environmental sensors,
generate a plurality of data subfusions, wherein each data subfusion is based on sensor data of a plurality of the at least three environmental sensors excluding sensor data of a different one of the at least three environmental sensors,
compare the plurality of data subfusions with one another to determine that a calibration of at least one of the at least three environmental sensors is incorrect and identify the at least one of the at least three environmental sensors as a decalibrated environmental sensor, and
generate, based on comparing the plurality of data subfusions with one another, an item of information to correct the calibration of the decalibrated environmental sensor.

8. The transportation vehicle of claim 7, wherein the item of information identifies at least one of the decalibrated environmental sensor and at least one of the plurality of data subfusion that is error-free.

9. The transportation vehicle of claim 7, wherein the control unit is configured to one of generate object hypotheses based on the sensor data of the at least three environmental sensors and receive the object hypotheses from the at least three environmental sensors, and wherein the control unit is configured to both generate the plurality of data subfusions and compare the plurality of data subfusions with one another based on the object hypotheses.

10. The transportation vehicle of claim 9, wherein the object hypotheses include bounding boxes.

11. The transportation vehicle of claim 9, wherein the control unit is configured to determine at least one translation matrix and/or at least one rotation matrix based on the object hypotheses, and wherein to compare the plurality of data subfusions to determine the decalibrated environmental sensor includes comparing the at least one translation matrix and/or the at least one rotation matrix or at least one value derived therefrom to at least one threshold value.

12. The transportation vehicle of claim 9, wherein the control unit is configured to derive parameters for a cross calibration based on the at least one translation matrix and/or the at least one rotation matrix.

13. A method for a transportation vehicle, the method comprising:
receiving, by a control unit, sensor data from at least three environmental sensors, wherein the sensor data includes data related to an environment of the transportation vehicle;
generating a plurality of data subfusions, wherein each data subfusion is based on sensor data of a plurality of the at least three environmental sensors and excluding sensor data of a different one of the at least three environmental sensors;
comparing the plurality of data subfusions with one another to determine that a calibration of at least one of the at least three environmental sensors is incorrect and identifying the at least one of the at least three environmental sensors as a decalibrated environmental sensor; and
generating, based on comparing the plurality of data subfusions with one another, an item of information to correct the calibration of the decalibrated environmental sensor.

14. The method of claim 13, wherein the item of information identified at least one of the decalibrated environmental sensor and at least one of the plurality of data subfusion that is error-free.

15. The method of claim 13, further comprising one of generating object hypotheses based on the sensor data of the at least three environmental sensors and receiving the object hypotheses from the at least three environmental sensors, wherein both generating the plurality of data subfusions and comparing the plurality of data subfusions with one another is based on the object hypotheses.

16. The method of claim 15, wherein the object hypotheses include bounding boxes.

17. The method of claim 15, further comprising determining at least one translation matrix and/or at least one rotation matrix based on the object hypotheses, wherein comparing the plurality of data subfusions to determine the decalibrated environmental sensor includes comparing the at least one translation matrix and/or the at least one rotation matrix or at least one value derived therefrom to at least one threshold value.

18. The method of claim 17, further comprising deriving parameters for a cross calibration based on the at least one translation matrix and/or the at least one rotation matrix.

* * * * *